Figure 46:
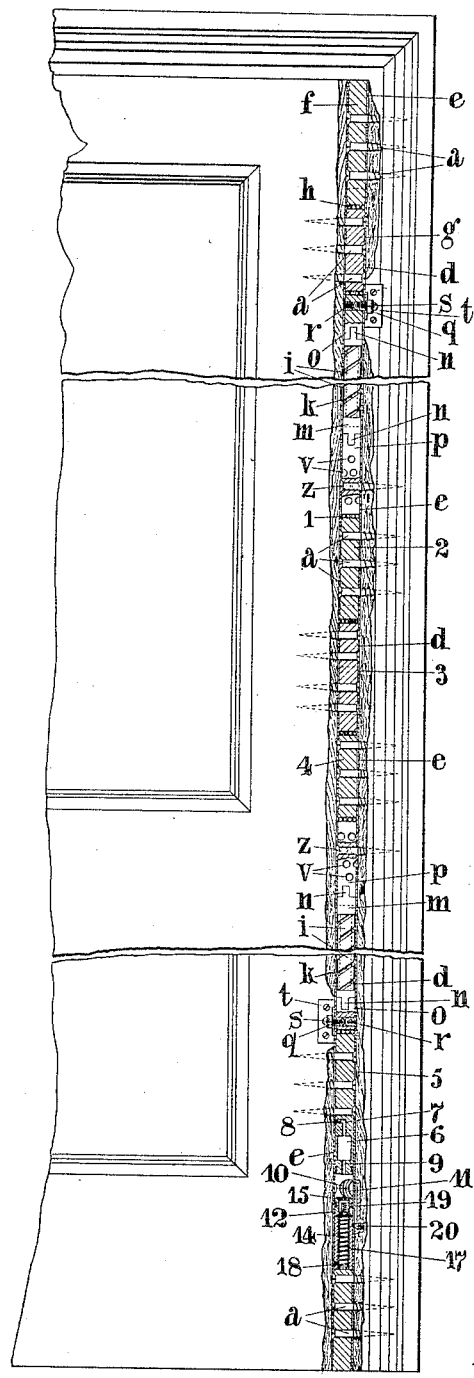

G. J. MONEY.
SPRING HINGE.
APPLICATION FILED JUNE 4, 1910.
1,071,256.
Patented Aug. 26, 1913.
4 SHEETS—SHEET 1.
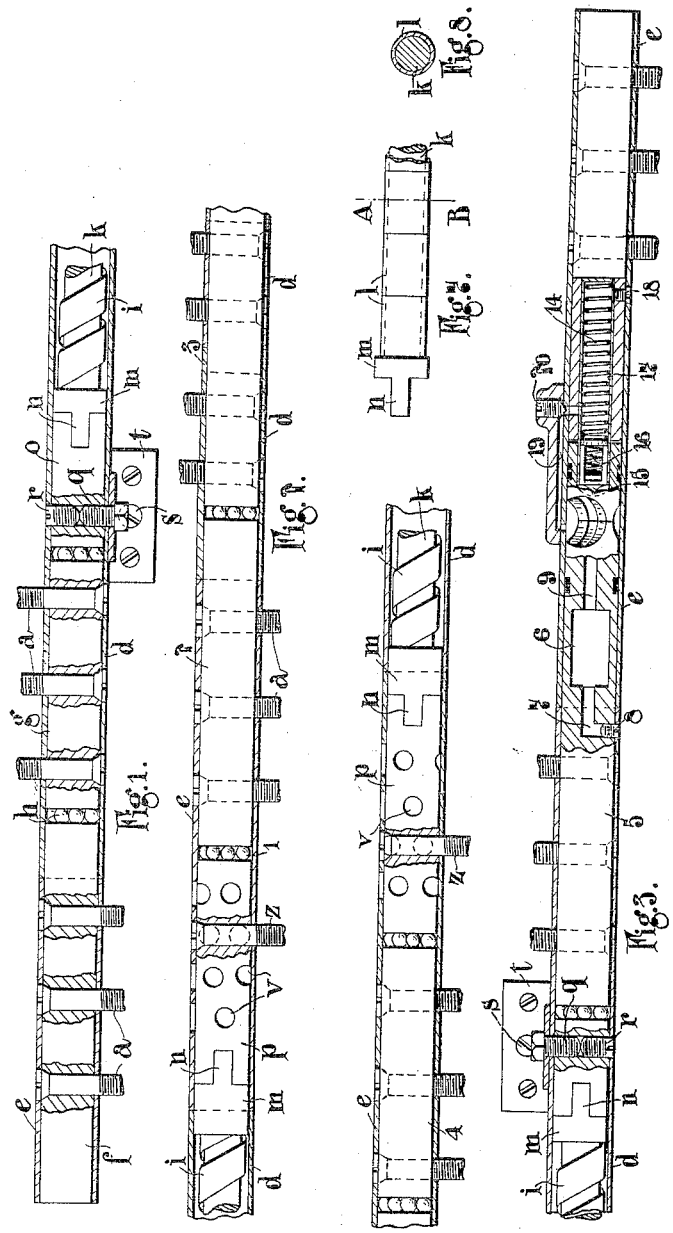
Witnesses:
Olive D. White
Margaret Dunham
Inventor:
George John Money
By Daniel Bonnelycke
Atty

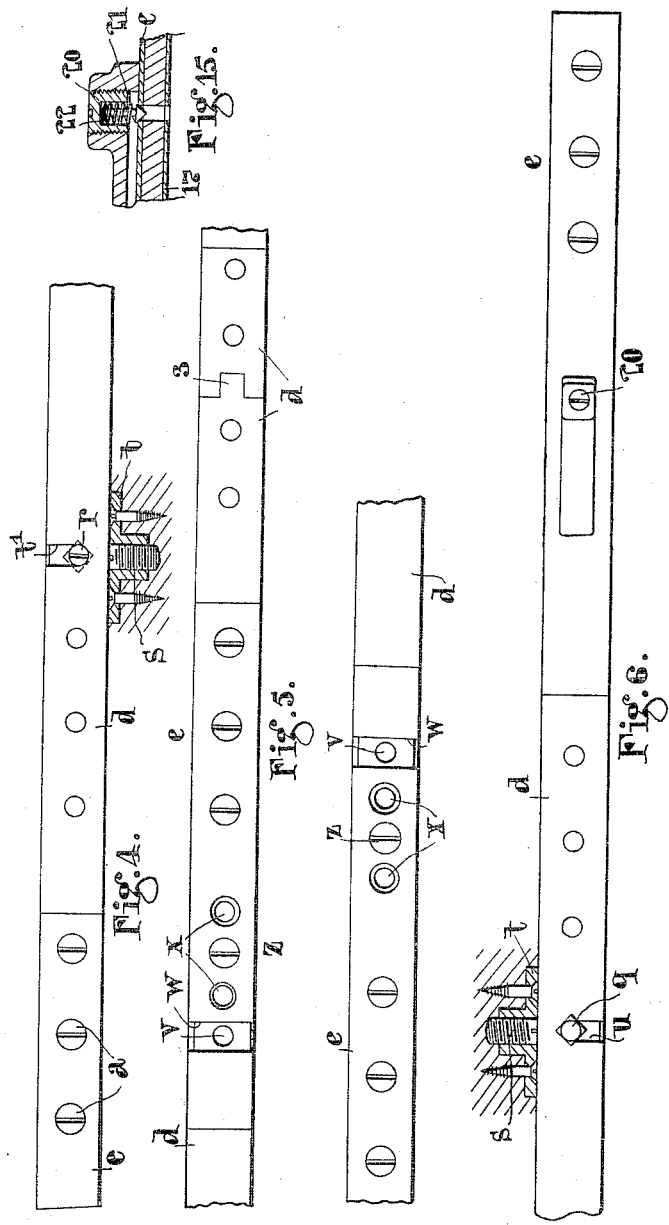

G. J. MONEY.
SPRING HINGE.
APPLICATION FILED JUNE 4, 1910.
1,071,256.
Patented Aug. 26, 1913.
4 SHEETS—SHEET 3.
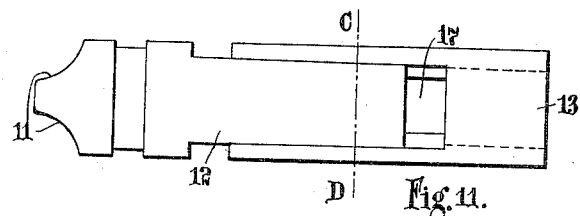
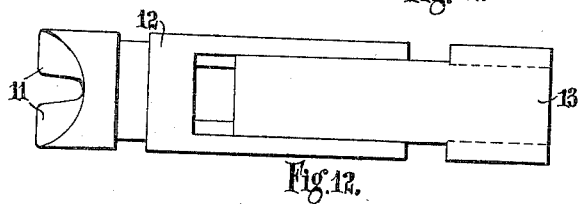
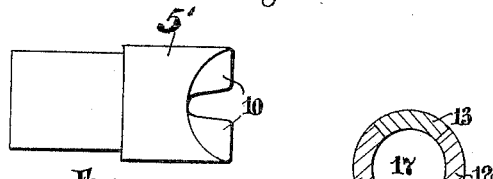
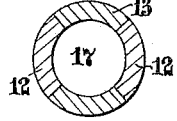
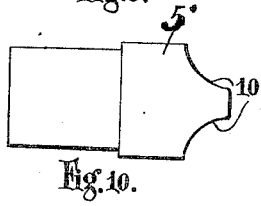
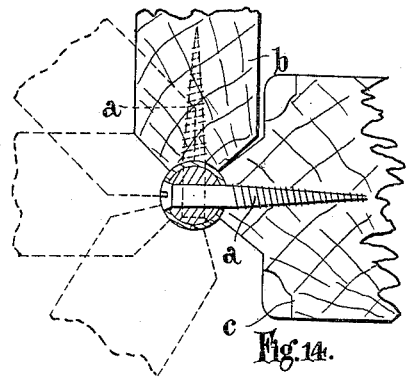
Witnesses:
Olive D. White
Margaret Dunbar
Inventor:
George John Money
By Annie Bainbridge
Atty.
COLUMBIA PLANOGRAPH CO., WASHINGTON, D. C.

G. J. MONEY.
SPRING HINGE.
APPLICATION FILED JUNE 4, 1910.

1,071,256.

Patented Aug. 26, 1913.
4 SHEETS—SHEET 4.

Witnesses:
Olive D. White
Edward W. Whitman

Inventor:
George John Money
By Emil Bönnelyche
Attorney

UNITED STATES PATENT OFFICE.

GEORGE JOHN MONEY, OF MILE END, LONDON, ENGLAND.

SPRING-HINGE.

1,071,256.  Specification of Letters Patent.  Patented Aug. 26, 1913.

Application filed June 4, 1910. Serial No. 564,987.

*To all whom it may concern:*

Be it known that I, GEORGE JOHN MONEY, subject of the King of Great Britain and Ireland, residing at 73 Grafton street, Mile End, in the county of London, England, have invented a certain new and useful Improved Spring-Hinge, of which the following is a specification.

This invention relates to improvements in connection with hinges for doors and the like and of the type which are composed of sections alternately fixed to the door and door-post or other parts to be hinged.

The present invention has for its object to produce an improved hinge of this type which without having its sight and draft-proof qualities impaired, may be provided in a self-contained manner with a spring for rendering the door or other movable part self-closing and also, if desired, with a device for automatically checking the closing movement of the door or the like.

The invention also comprises the adaptation of the hinge to a double action door and other details hereinafter more particularly referred to.

In the accompanying drawings, which illustrate one mode of carrying out the invention, Figures 1, 2 and 3 illustrate in sectional elevation the upper, middle and lower portions of the hinge respectively. Figs. 4, 5 and 6 are similar views in plan. Fig. 7 is an elevation illustrating a detail. Fig. 8 is a section on the line A—B of Fig. 7. Figs. 9 and 10 are respectively an elevation and plan illustrating a detail. Figs. 11 and 12 are similar views of a further detail. Fig. 13 is a section on the line C—D of Fig. 11. Fig. 14 is a section illustrating the method of attaching the hinge to the door and door-post. Fig. 15 is a sectional elevation illustrating a modification of a detail. Fig. 16 is a sectional elevation of the hinge in position showing the general arrangement and construction.

In carrying my invention into effect in one convenient manner, as in its application to a double-action door, the hinge, which extends for the whole length of the door so as to be sight and draft-proof, is composed of a number of tubular sections of any suitable metal such as steel, bronze or iron, alternately fixed by means of screws $a$ or the like, to the door $b$ and door-post $c$ which are grooved for the reception of the hinge, as clearly shown in Fig. 14.

In the drawings, the sections marked $d$ are attached to the door, while those marked $e$ are attached to the door-post. In the following description it will be convenient to commence at the upper end of the hinge that is, the portions shown in Figs. 1 and 4. The first tubular or barrel section of the hinge, which may be filled with a steel or other core $f$, is attached to the door-post. The next section, which is secured to the door, is filled at its upper part where it is secured to the door by means of the screws $a$ with a steel or other core $g$, suitable balls or rollers $h$ being placed between the cores $f$ and $g$ for the purpose of minimizing friction. The hinge section under consideration also contains a spring $i$ whose function is to cause the door to automatically close when it has been opened and then released. The spring $i$ is of spiral or helical form and is constructed of flat steel strip the section of the strip and the length of the spring depending on the weight of door to which the hinge is to be attached. Arranged concentrically within the spring $i$ is a rod $k$ on which are threaded a number of tubes $l$ (Figs. 7 and 8) and the spring is preferably so formed that when full tension is put upon it the edges of the coils abut against one another while the coils are contracted so as to grip the tubes or collars $l$. By the provision of these tubes or collars, as is already known, abrasion of the central rod is prevented and each coil of the spring is adapted to do only its share of the work, so that there is less likelihood of the spring breaking than would be the case if the tubes and rod were not employed. Formed integral with, or attached to each end of the rod or pintle $k$ is a cylindrical piece $m$ of steel or other suitable material provided with a tongue $n$, the ends of the spring $i$ being riveted or otherwise secured to said pieces $m$. The upper piece $m$ is adapted to be fitted, by means of its tongue $n$, to a cylindrical piece $o$ of hard steel adapted to work easily inside the tubular section of hinge in which it is placed, while the other end piece $m$ (Fig. 2) is attached to a similar steel piece $p$ located in the next fixed section $e$ of the hinge. The piece $o$ between which and the core $g$ are balls or rollers $h$, has a hole drilled and tapped in it for the reception of two set screws or the like $q$, $r$, $q$ being provided with a projecting head adapted to engage with a stop pin or the like $s$ fixed to a plate $t$ secured to the door-post *c* for a purpose hereinafter set forth while the set screw *r* is substantially flush with the outside surface of the hinge barrel. The hinge barrel is slotted as shown at *t'* (Figs. 4 and 6), these slots being provided for the set screws *r* and *q* to work in for a reason which will be apparent when the operation of the hinge is described.

The piece *p* in the fixed section of the hinge is provided with a number of holes *v* while the barrel is slotted as shown at *w* (Fig. 5) and is provided with three holes *x*. By inserting a tommy-bar or like tool through the slot *w* and into the piece *p*, the latter can be rotated until one or other of the holes *v* is in coincidence with one of the holes *x*, when a screw *z* may be inserted through the piece *p* and into the door-post *c* thus fixing the piece *p* in position. In this way the spring *i* may be tensioned to any desired amount, depending upon the number of holes determining the number of positions in which *p* may be held fixed. A ball bearing 1 may be arranged between the piece *p* and the core-piece 2 which is fixed by means of the screws *a* to the door-post. The next section of the hinge may be formed in one part, although it is convenient to form it in two parts, as shown, with a tongue and groove or like joint 3; this arrangement allowing of the removal of one half of the hinge in one piece without removing the door, while it also allows of fixing the hinge in the sill and transom rail when desired, for example, for the purpose of strengthening light partition doors. The next section *e*, provided with a core piece 4, is fixed to the door-post, ball bearings being arranged at each end, as shown. As the door is to be a double-action door, the next section contains a spring *i*, identical in all respects with the spring arrangement described above with the exception that, as the two springs are to operate to close the door from opposite directions, the upper part of the latter spring is fixed and its lower part movable, while in the former spring this arrangement is reversed. It is also to be noticed that the stop pin *s* and the plate *t* are arranged on the opposite side of the door-post.

The last section of the hinge, which is fixed to the door-post, contains a device for checking or retarding the closing of the door, and as all the parts are symmetrical, it is to be noted that the check device will operate whatever be the direction from which the door is closed. The core piece 5 in the fixed section of the hinge is provided with a chamber or reservoir 6 adapted to hold oil or other liquid such as is usually used for check devices employed in connection with self-closing doors, the chamber or reservoir being provided with an inlet passage 7 adapted to be closed by a screw or the like 8 and through which the oil or other liquid may be inserted. Another port or passage 9 leads from the chamber 6 to the end 5' of the core piece, which end is formed with a double set of inclined faces 10, as shown in Figs. 9 and 10. The core piece 5 may be formed of cast steel and all in one piece, but it is preferred to make a wrought steel end piece, as shown in Figs. 9 and 10. The core piece 5 rotates with the door and below it is a further piece 12 provided with inclined or cam-like faces 11, adapted to coöperate with the cam faces 10 and to constitute a plunger operative in the fluid chamber of the check. This second arrangement, which consists essentially of two parts, will be well understood from Figs. 11 to 13. Both parts are preferably formed of wrought steel, one portion 12, having the cam faces 11 being of the form shown, and being adapted to slide easily in slides formed on the second part or sleeve 13 which is secured to the hinge barrel *e* in any desired manner. The piece 12 is normally pressed upward by a spring 14 (Fig. 3) while it is also provided with a non-return valve 15 held up to its seat by a small spring 16. The space 17 in which the spring 14 is situated forms a reserve chamber for the oil or other liquid, and it is provided with an outlet closed by a screw 18, the outlet being provided for emptying the liquid out of the interior when desired. Connecting the upper and lower oil chambers is a by-pass passage 19 the opening of which is adapted to be regulated by means of a regulating screw or valve 20 for the purpose of adjusting the resistance to closing of the checking device.

Fig. 15 is a fragmentary view showing an alternative method of controlling the resistance to closing of the checking device. The outlet from the chamber 17 is closed by a spindle 21 controlled by means of a light helical or other suitable spring 22 the compression of which can be adjusted by means of the screw 20. The compression of the spring 22 thus regulates the check, and the arrangement is particularly useful for doors with which the closing has sometimes to be accelerated, as the spring 22 will yield to extra pressure and there will be no undue wear on the points formed respectively by the cam faces 10 and 11.

The operation is as follows: Supposing the door to be opened in to the position shown in Fig. 14, the upper spring *i*, will be tensioned as the bolts or set screws *q* and *r* rotate with the hinge, so that when the door is released the spring tends to uncoil and thus exerts a pressure on the hinge-barrel through the medium of the set screws *q* and *r* engaging with the ends of the slots in the hinge barrel into which they project. The door will thus be closed and it is to be understood that the slots in the hinge-barrel must be of sufficient length to allow of the rotation of the door in the direction opposite that shown in Fig. 14. When the door has reached its closed position the head of the set screw *q* comes into contact with the stop-pin *s* on the door-post, and thus operates to relieve the tension of the spring *i*. During the rotation of the door the core-piece 5 also rotates and its inclined faces 10 coöperate with the inclined faces 11 of the piece 12 to allow the latter to be forced upward by the spring 14. This causes some of the liquid to be forced from the upper chamber past the non-return valve 15 into the compression chamber 17. When the door is released and is being closed by the spring the cam-like faces 10 on the end of the core-piece 5 coact with the cam faces 11 to force the piece 12 back. The oil or liquid in the chamber 17, being unable to pass the non-return valve 15, is forced through the by-pass 19, thus checking the closing of the door, and by regulating the opening to the by-pass 19 by the screw 20, the strength of the checking device may be varied. The checking device above described is somewhat similar in operation to liquid checks hitherto proposed.

It will be obvious, from the foregoing description and from the fact that the two springs are oppositely disposed with regard to their fixed and free ends and that the stop pins *s* and projecting heads of the set screws *q* are arranged on opposite sides of the hinge-barrel, that one spring operates to close the door from one direction while the second spring is inoperative, and vice versa.

It is obvious that various modifications may be introduced in my invention to suit the various purposes for which the hinge is required, as it may be used in conjunction with any articles such as doors, windows, box-lids and the like which require to be hinged. For example, with heavy doors and when it is desirable to keep the length of the closing spring as small as possible, instead of employing a single closing spring, I may provide two or more springs acting in the same direction and arranged in concentric relation to one another, the ends of these springs, being secured together and to the metal or other piece at each end of the spring. It will also be understood that when the door is a single action door, that is, one which opens in one direction only, only one closing spring and its appurtenances will be necessary. If desired, at points where excessive strain comes upon the hinges suitable back-plates may be let into the door or door-post to preserve the groove in said door or door-post from wear. Similarly the arrangement of set screws and stop pins may be somewhat modified when it is desired to retain the door in an open position. In this case, the bolts or set screws are formed with eccentric heads and are adapted to fit into a sleeve screwed into the hinge-barrel, this latter arrangement being preferable to screwing the set screws directly into the barrel in order that they may be the more easily turned by hand. When it is desired to retain the door ajar the set screws are rotated so that the heads come in contact with the door post or stop before the door reaches its closed position.

It is to be understood that I do not confine my invention to any particular size or shape of hinge nor to any particular material from which it is to be made, nor to any specified type of valve for the check action, as all these details may be modified without departing from the spirit of my invention.

Having now described my invention what I claim as new and desire to secure by Letters Patent is:—

1. A hinge comprising a number of cylindrical sections alternately secured to the fixed and movable parts and forming a continuous barrel extending throughout the whole length of said parts, a closing spring contained within said hinge barrel, a core-piece within and movable with said hinge barrel, said core-piece containing a liquid chamber and being provided at one end with inclined cam faces, a second core-piece mounted in said barrel for a longitudinal movement therein and having inclined cam faces at one end adapted to coact with the cam faces of the first core-piece, a non-return valve fitted to the second core-piece through which the liquid can pass from the first liquid chamber to a second liquid chamber in said hinge and a by-pass connecting said liquid chambers.

2. A hinge comprising a number of cylindrical sections alternately secured to the fixed and movable parts forming a continuous barrel extending throughout the whole length of said parts, a closing spring contained within said hinge barrel, a core-piece within and movable with said hinge barrel, said core-piece containing a liquid chamber and being provided at one end with inclined cam faces, a second core-piece mounted in said barrel for longitudinal movement therein and having inclined cam faces at one end adapted to coact with the cam faces of the first core-piece, a non-return valve fitted to the second core-piece through which liquid can pass from the first liquid chamber to a second liquid chamber in said hinge, a by-pass connecting said liquid chambers and a screw valve for regulating the flow of liquid through said by-pass as set forth.

3. A hinge comprising a number of cylindrical sections, alternately secured to the fixed and movable parts and forming a continuous barrel extending over the whole length of said parts, two closing springs arranged within the hinge and adapted to close the door from either of two directions, means for rendering said springs independent of one another, means for varying the tension of the closing springs and means within the hinge barrel adapted to resist the closing forces exerted by said springs as set forth.

4. A hinge comprising a number of cylindrical sections alternately secured to the fixed and movable parts and forming a continuous barrel extending for the whole length of said parts, two closing springs arranged within the hinge barrel and adapted to close the door from either of two directions, a block fixed to one end of each spring and adapted to move freely within the hinge barrel, a projection on each of said blocks projecting through and engaging with a slot in the hinge barrel, fixed stops upon the fixed part to which some of the sections of the hinge are secured adapted to engage such projections when the hinge part is in its closed position, means for varying the tension of the springs and means within the hinge barrel adapted to resist the closing force exerted by said springs as set forth.

In testimony whereof I affix my signature in presence of two witnesses.

GEORGE JOHN MONEY.

Witnesses:
W. WARREN TRIGGS,
BERTRAM H. MATTHEWS.

---

Copies of this patent may be obtained for five cents each, by addressing the "Commissioner of Patents, Washington, D. C."